US010822237B2

(12) United States Patent
Jang et al.

(10) Patent No.: US 10,822,237 B2
(45) Date of Patent: Nov. 3, 2020

(54) METHOD FOR MANUFACTURING GRAPHENE BALLS

(71) Applicant: Korea Institute Of Geoscience And Mineral Resources, Daejeon (KR)

(72) Inventors: Hee-Dong Jang, Daejeon (KR); Han-Kwon Chang, Daejeon (KR); Ji-Hyuk Choi, Daejeon (KR)

(73) Assignee: Korea Institute Of Geoscience And Mineral Resources, Daejeon (KR)

( * ) Notice: Subject to any disclaimer, the term of this patent is extended or adjusted under 35 U.S.C. 154(b) by 62 days.

(21) Appl. No.: 16/306,247

(22) PCT Filed: Mar. 14, 2017

(86) PCT No.: PCT/KR2017/002756
§ 371 (c)(1),
(2) Date: Nov. 30, 2018

(87) PCT Pub. No.: WO2017/209380
PCT Pub. Date: Dec. 7, 2017

(65) Prior Publication Data
US 2019/0112194 A1    Apr. 18, 2019

(30) Foreign Application Priority Data

Jun. 1, 2016    (KR) .......................... 10-2016-0067858

(51) Int. Cl.
*C01B 32/184*    (2017.01)
*C01B 32/192*    (2017.01)
(Continued)

(52) U.S. Cl.
CPC .......... *C01B 32/184* (2017.08); *C01B 32/192* (2017.08); *C01B 32/194* (2017.08);
(Continued)

(58) Field of Classification Search
None
See application file for complete search history.

(56) References Cited

U.S. PATENT DOCUMENTS

| | | | | |
|---|---|---|---|---|
| 2013/0004798 | A1* | 1/2013 | Huang | B82Y 40/00 429/2 |
| 2014/0205841 | A1* | 7/2014 | Qiu | C01B 32/184 428/402 |
| 2014/0339078 | A1* | 11/2014 | Jang | C12Q 1/006 204/403.14 |

FOREIGN PATENT DOCUMENTS

| | | |
|---|---|---|
| CN | 103341346 B | 7/2015 |
| CN | 104785177 A | 7/2015 |

(Continued)

OTHER PUBLICATIONS

Mao, S. et al., "A General Approach to One-Pot Fabrication of Crumpled Graphene-Based Nanohybrids for Energy Applications", ACS Nano, Jul. 29, 2012, vol. 6, No. 8, pp. 7505-7513.

(Continued)

*Primary Examiner* — Mary Lynn F Theisen
(74) *Attorney, Agent, or Firm* — Harness, Dickey & Pierce, P.L.C.

(57) ABSTRACT

A method for preparing graphene balls, the method including,
a) preparing a dispersion which includes, a graphene oxide, a reducing agent ranging from a monosaccharide to a polysaccharide, ammonia water and a dispersion medium; and
b) spraying and drying the dispersion. According to the preparation method of the present disclosure, it is possible to prepare uniformly sized and spherical graphene balls.

(Continued)

Such graphene can be applied to various fields due to excellent physical and chemical characteristics.

8 Claims, 4 Drawing Sheets

(51) Int. Cl.
    *C01B 32/194*     (2017.01)
    *C01B 32/198*     (2017.01)
    *B01J 2/04*     (2006.01)
    *B82Y 30/00*     (2011.01)
    *B82Y 40/00*     (2011.01)

(52) U.S. Cl.
    CPC ............... *C01B 32/198* (2017.08); *B01J 2/04* (2013.01); *B82Y 30/00* (2013.01); *B82Y 40/00* (2013.01); *C01B 2204/22* (2013.01); *C01P 2002/72* (2013.01); *C01P 2002/82* (2013.01); *C01P 2004/03* (2013.01)

(56) References Cited

FOREIGN PATENT DOCUMENTS

| | | |
|---|---|---|
| CN | 105113032 A | 12/2015 |
| KR | 10-1676024 B1 | 11/2016 |

OTHER PUBLICATIONS

Xu, C. et al., "Fabrication and Characteristics of Reduced Graphene Oxide Produced with Different Green Reductants", PLOS ONE, Dec. 14, 2015, vol. 10, Article No. e0144842, pp. 1-15.

International Search Report PCT/ISA/210 for International Application No. PCT/KR2017/002756 Dated May 18, 2017.

\* cited by examiner

METHOD FOR MANUFACTURING GRAPHENE BALLS

CROSS-REFERENCE TO RELATED APPLICATION

This application claims priority to Korean Patent Application No. 10-2016-0067858 filed on Jun. 1, 2016, and all the benefits accruing therefrom under 35 U.S.C. § 119, the contents of which is incorporated by reference in its entirety.

BACKGROUND OF THE INVENTION

1. Field of the Invention

The present disclosure relates to a method of preparing graphene balls, uniform in size, that are easy to handle.

2. Description of the Related Art

Graphene is a carbon nanomaterial having a planar structure wherein carbon atoms connected by a $sp^2$ bond. Graphene is being used in a wide range of fields including batteries, super capacitors, nanocomposites, biosensors, fuel cells and the like, because unlike the general carbon, graphene has characteristics such as high electrical conductivity, wide specific surface area, excellent mechanical strength and chemical stability.

Methods for producing such graphene include physical exfoliation, chemical vapor deposition, and chemical methods and so on. Among these methods, the chemical method utilizes oxidation-reduction characteristics of graphite to obtain graphene. In the chemical method, graphite is oxidized with a strong acid and an oxidizing agent, which produces an oxide form of the graphite, to expand spaces between carbons for exfoliation. After exfoliation, the oxide is reduced and graphene is obtained. Chemical methods are relatively inexpensive, are possible to use for mass production, and are the closest to commercialization because they have the advantage of easily forming a composite with other materials. Reduction methods mainly used in chemical methods include thermal, electrical and chemical reduction methods. Among them, the chemical reduction method is relatively inexpensive and mass production is possible, and has a greater yield than the other reduction method, so the possibility of commercial application is the highest.

As representative reducing agents, $NaBH_4$ or hydrazine and the like are used in the chemical reduction method. However, $NaBH_4$ has characteristics that complicate the reduction process, and hydrazine is highly toxic and can cause environmental problems.

Most of the graphene obtained by the chemical reduction method have a two-dimensional shape, in the form of a thin sheet, such as paper. However, such two-dimensional graphene tend to be laminated with van der Waals attraction force. Such lamination of graphene may increase the resistance between the graphene sheets and cause decrease in specific surface area. Consequently, a problem may occur in that the excellent properties of graphene fail to be utilized. In order to solve such a problem, researches on methods of preparing graphene having a three-dimensional shape instead of a two-dimensional shape are being actively carried out.

At present, various methods for preparing graphene having a three-dimensional shape have been disclosed. The various methods include using chemical vapor deposition, template use, and hydrothermal synthesis, and so on to assemble graphene. However, such graphene made to have a three-dimensional shape have problems in that they are not uniform in shape, or they include organic impurities, which makes washing difficult.

SUMMARY OF THE INVENTION

The present disclosure is directed to solving the above-mentioned problems.

The present disclosure is directed to providing a method for preparing graphene balls that are uniform in size and have a high sphericalness.

The present disclosure is also directed to providing a method for preparing graphene balls, to produce spherical graphene balls that are uniform in size and easily applicable to various fields.

The present disclosure is further directed to providing a method for preparing graphene balls, wherein a small amount of an additive is added during the preparing of the graphene balls for easy separation of impurities.

The present disclosure provides a method for preparing graphene balls that solves the above-mentioned problems.

According to an aspect of the present disclosure, a method for preparing graphene balls includes, a) preparing a dispersion which includes, a graphene oxide, a reducing agent ranging from a monosaccharide to a polysaccharide, and ammonia water; and b) spraying and drying the dispersion.

According to an aspect of a method for preparing graphene balls of the present disclosure, the step a) may include, a1) preparing a first dispersion which includes a graphene oxide and a reducing agent ranging from a monosaccharide to a polysaccharide; and a2) mixing the first dispersion with ammonia water to prepare a second dispersion.

According to an aspect of a method for preparing graphene balls of the present disclosure, the reducing agent ranging from a monosaccharide to a polysaccharide may be one or more selected from a group consisting of glucose, fructose, galactose, sucrose, maltose and lactose.

According to an aspect of a method for preparing graphene balls of the present disclosure, the dispersion may contain 0.1 to 2% by weight of the graphene oxide.

According to an aspect of a method for preparing graphene balls of the present disclosure, the dispersion may contain 0.3 to 3% by weight of the reducing agent ranging from a monosaccharide to a polysaccharide.

According to an aspect of a method for preparing graphene balls of the present disclosure, the dispersion may contain 1 to 10% by weight of the ammonia water.

According to an aspect of a method for preparing graphene balls of the present disclosure, the step a2) may be performed at 80 to 100° C. for 30 minutes to 2 hours.

According to an aspect of a method for preparing graphene balls of the present disclosure, the step b) may be performed at 150 to 250° C.

According to an aspect of a method for preparing graphene balls of the present disclosure, the method may further include drying at 50 to 70° C. for 12 to 48 hours after the step b).

According to the preparation method of the present disclosure, it is possible to prepare uniformly sized graphene balls.

It is possible to easily produce graphene balls according to the preparation method of the present disclosure because the preparing steps are relatively simple.

According to the preparation method of the present disclosure, it is possible to produce graphene balls uniform in size that can be easily used in batteries, biosensors, nanocomposites, super capacitors, fuel cells and the like.

DETAILED DESCRIPTION OF THE INVENTION

Figure 1:
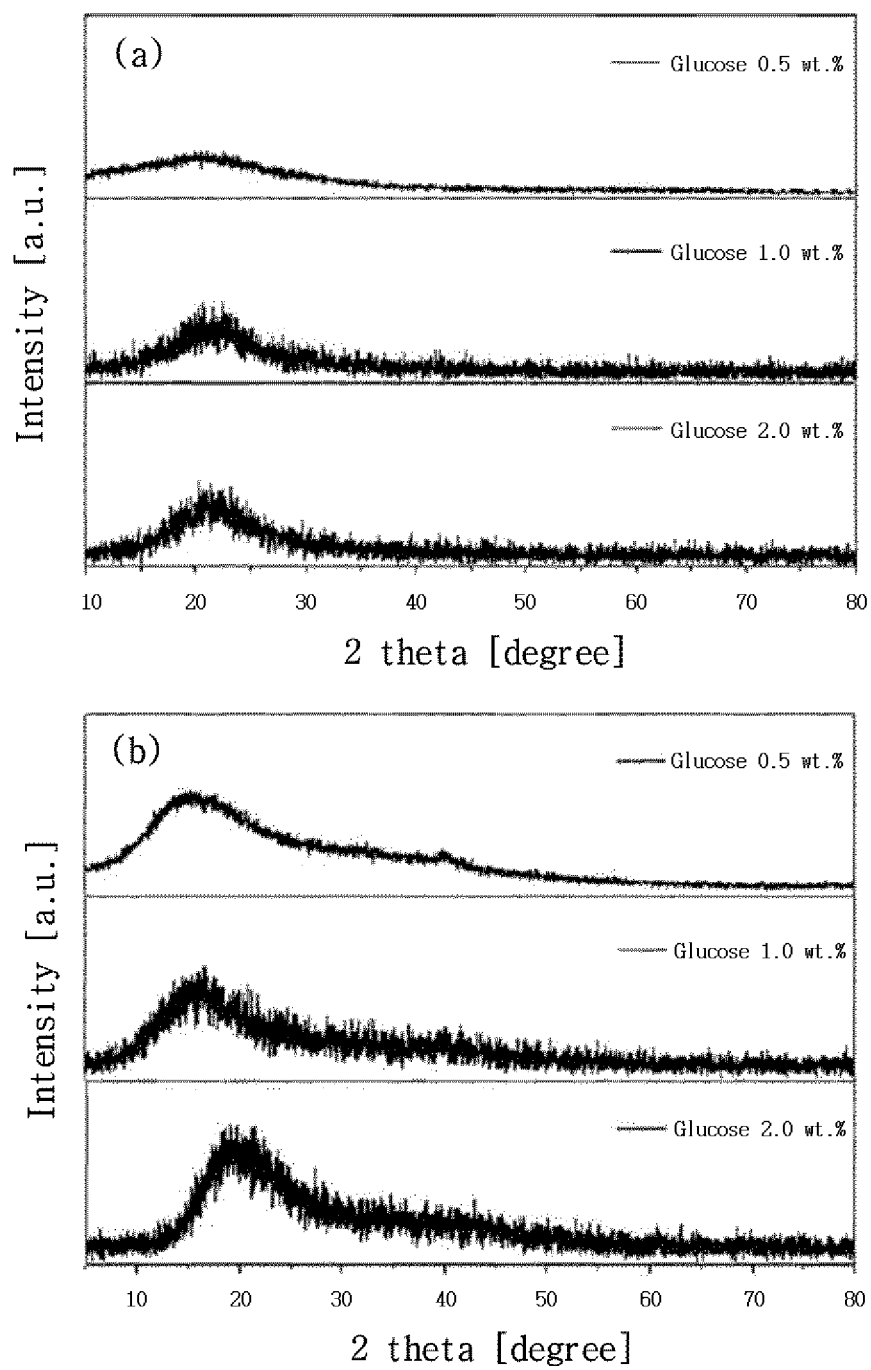
FIG. 1 shows an analysis result of the crystal form of graphene balls according to the concentration of glucose.

Hereinafter, an exemplary embodiment of the present invention will be described in detail. It is to be understood, however, that the embodiments described below are only for the understanding of the invention, and the present invention is not limited by the following embodiments. Also, the terms used in the present invention are based on the general knowledge level of an ordinary skilled person in the art unless otherwise defined, and the description of well-known techniques which obscure the gist of the invention is omitted.

Conventionally, when graphene grains are prepared using a general spray drying process in a method for preparing graphene powder or graphene balls, there is a problem in that it is difficult to control the size and shape of the grains, so the size and shape of the graphene grains are irregular and their chemical characteristics are not constant.

Thus, the applicant of the present disclosure has studied to produce uniformly sized graphene balls. As a result, it has been found that when a reducing agent ranging from a monosaccharide to a polysaccharide and ammonia water are simultaneously mixed and spray-dried, uniformly sized and spherical graphene balls can be produced.

The present disclosure relates to a method for preparing graphene balls that includes, a) preparing a dispersion which includes, a graphene oxide, a reducing agent ranging from a monosaccharide to a polysaccharide, and ammonia water; and b) spraying and drying the dispersion.

Graphene balls produced by the preparation method of the present disclosure are spherical and are advantageous in that they are uniform in size. Specifically, uniformly sized graphene balls can be produced when the graphene balls are prepared using a chemical reduction method, by adding a reducing agent, ranging from a monosaccharide to a polysaccharide (hereinafter referred to as a reducing sugar), and ammonia water and through a spray drying process. The graphene balls produced by the preparation method of the present disclosure are spherical and excellent in isotropy, stability, dispersibility and flowability, and are uniformly sized, and are characterized in that the physical and chemical properties of the graphene balls are constant. Such features are advantageous in that they allow easy application to various fields such as batteries, fuel cells, supercapacitors and the like.

As described above, graphene balls can be prepared when a reducing agent ranging from a monosaccharide to a polysaccharide is mixed with ammonia water and then the spray drying process is performed. The sugar-based reducing agent used with ammonia water in the preparation method of the present disclosure is not limited, as long as the sugar-based reducing agent is a monosaccharide or a polysaccharide having a reducing ability. Preferably, the sugar-based reducing agent may be one or two or more selected from glucose, fructose, galactose, sucrose, maltose and lactose. These reducing agents are natural components that lessen environmental pollution. Also, in the present disclosure, when graphene balls are prepared by mixing the reducing agent with other components and then spraying and drying, impurities can be relatively easily removed, thereby reducing the production cost. Specifically, since it is possible to remove the impurities from the surface of the graphene balls even at a relatively low temperature, there is an advantage that the factors that may affect the characteristics of the graphene balls can be minimalized.

The reducing agent used in the method for preparing graphene balls according to an embodiment of the present disclosure may be glucose or fructose, and more preferably glucose. When glucose or fructose is used, the viscosity of the dispersion is improved prior to the spray drying, which helps produce particles of graphene balls as well as serves to make the particles that are sprayed in the spray drying process to be uniformly sized when the glucose or fructose is mixed with ammonia water which will be described later. Further, when glucose or fructose is used in the spraying process according to the present disclosure, it is possible to produce graphene balls having higher sphericalness and uniformity than when adding other additives having similar viscosity. Although this is not clearly shown, it is determined that glucose or fructose affects the surface of the droplets that are sprayed and dried with ammonia water during the spraying. In addition, when glucose or fructose is used to control the viscosity, it is not necessary to add any other additives for increasing the viscosity or for preparing spherical graphene balls. There is an advantage that high purity graphene balls can be prepared by an easier method because removal from the prepared graphene balls is more convenient.

In one embodiment of the present disclosure, spherical graphene balls can be prepared by mixing ammonia water together with a reducing sugar and then through a spray drying process. In the preparation method according to an embodiment of the present disclosure, when ammonia water is not mixed, there is a limit in that graphene grains are produced to have non-uniform sizes and irregular shapes. Although this is not clearly shown, it is determined that when the above-mentioned reducing sugar, more preferably glucose or fructose is mixed together, this affects the surface of the droplets during the spray drying process to produce uniformly sized spherical shapes.

Specifically, ammonia water and glucose or fructose, more specifically, when ammonia water and glucose are mixed and the spray drying process is performed after a reduction reaction of graphene oxide is performed, graphene balls having uniform size and being close to a real sphere shape can be prepared.

According to an embodiment of the present disclosure, the dispersion of the step a) may contain 0.3 to 3% by weight, and more preferably, 0.5 to 2.5% by weight of the reducing sugar, and 1 to 10% by weight, and more preferably, 2 to 7% by weight of ammonia water. When the reducing sugar and ammonia water is contained within the above-mentioned range, graphene balls uniformly sized and having a high sphericalness can be prepared. Specifically, the sphericalness in the present disclosure is defined as the average sphericalness of the graphene balls. The average sphericalness of the graphene balls shows the average value of the ratio of the shortest diameter ($d_{short}$) of a graphene ball to the longest diameter ($d_{long}$) of the graphene ball. As shown in Equation 1 below, the sphericalness of the graphene balls produced using the preparation method of the present disclosure may be 1 to 1.5, preferably 1 to 1.3, and more preferably 1 to 1.2.

$$1 \le \frac{d_{long}}{d_{short}} \le 1.5 \qquad [\text{Equation 1}]$$

When the sphericalness satisfies the above range, it is more advantageous in that the properties such as isotropy, stability, dispersibility and flowability are more excellent which makes it easy to handle.

Specifically, the amount of the reducing agent used in the method for preparing graphene balls of the present disclosure may be 0.3 to 3% by weight, preferably 0.5 to 2.5% by weight in the dispersion. When the reducing agent is added in an amount less than the above range, the reduction reaction is not sufficiently progressed and the yield of graphene balls is lowered. When the amount of the reducing agent is more than the above range, the surface of the graphene balls is affected during the spray drying process, and a problem may occur in that the ratio of real spherical graphene may be lowered.

When glucose or fructose, preferably glucose, is used as a reducing agent in the preparation method of the present disclosure, the amount of the reducing agent contained may be 0.3 to 3% by weight, preferably 0.5 to 2.5% by weight, and more preferably 0.5 to 2% by weight. When the amount of glucose or fructose added is less than the above range, the viscosity of the reducing agent is not sufficiently improved, and the size of the sprayed droplets becomes too small. Small droplets, with the mixing of ammonia water and reducing sugar, makes controlling the surface difficult, which causes a problem in that it becomes difficult to prepare spherical graphene. In addition, when glucose or fructose is added in an amount exceeding the above-mentioned range, the viscosity becomes excessively high, so that it is difficult to form droplets in the spray drying process.

The ammonia water according to an embodiment of the present disclosure refers to an ammonia aqueous solution of 20 to 35% by weight. Within the whole amount of dispersion, the ammonia water may be contained in an amount of 1 to 10% by weight, preferably 2 to 7% by weight, and more preferably 3 to 5% by weight. If the amount of ammonia water is less than the above range, the spherical shape may not be sufficiently formed. If the ammonia water is mixed more than the above range, the pH may become excessively high, which can affect the reduction process and on the contrary, this causes the problem of decrease in the proportion of particles having a real spherical form out of the produced graphene balls.

If the graphene oxide used in the method for preparing graphene balls according to the present disclosure is a carbon oxide generally used in the production of graphene ball, it is not limited. Specifically, it can be produced by a method of oxidizing carbon materials such as graphite and the like. More specifically, graphite can be produced by an oxidation method such as Hummer's method, Brodie's method or Staudenmaier method and the like for oxidation.

The graphene oxide added in the method for preparing graphene balls of the present disclosure may be contained in the total dispersion in an amount of 0.1 to 2% by weight, and preferably 0.5 to 1.5% by weight. When graphene oxide is added in an amount less than the above-mentioned range, the concentration of graphene oxide in the dispersion becomes excessively low, so it is difficult to produce uniformly sized graphene balls. When the concentration of graphene oxide is higher than the above-mentioned range, the graphene ball tend to aggregate during spraying and drying, and so there is a problem in that the produced graphene particles do not have a spherical shape and the size becomes uneven.

In the method for preparing graphene balls according to the present disclosure, step a) may be reducing graphene oxide. In step a), graphene dispersion is prepared as graphene oxide is reduced by a reducing gent. In step a), there is no limit to the temperature in which the reduction reaction proceeds, but specifically, the reaction may be performed at a temperature ranging from 80 to 100° C., and more specifically from 90 to 100° C. When the reaction proceeds in the above-mentioned temperature range, there is an advantage that the reduction reaction can be sufficiently carried out without applying excessive heat. Further, if there is a sufficient amount of time in which the reduction reaction can proceed, there is no limit to the reaction time in step a), but specifically, the reaction time may range from 30 to 120 minutes and more specifically from 40 to 90 minutes. If the reaction time is shorter than the above-mentioned range, the reduction reaction cannot be sufficiently performed. If the reaction time is longer than the above-mentioned range, a heated state is maintained even when there is no further reduction reaction taking place, which is inappropriate for the process, efficiency-wise.

Further, the dispersion medium used in the present disclosure is not limited as long as it is a solvent capable of dissolving the above-mentioned reducing sugar and easily miscible with water, but specifically, it may be water.

According to an embodiment of the present disclosure, the graphene dispersion preparation step a) may include, a1) preparing a first dispersion which includes a graphene oxide and a reducing agent; and a2) mixing the first dispersion with ammonia water to prepare a second dispersion.

In the step of preparing the graphene dispersion according to one embodiment of the present disclosure, by having the two steps performed, the progress rate of the reduction reaction of graphene oxide is improved, and more uniform graphene balls can be produced. Although this is not clearly shown, it is judged that the primary reduction reaction performed in step a1), and the ammonia water mixed with the dispersion having improved viscosity, affects the surface during spraying and drying.

Specifically, the step a1) is not limited as long as the above-mentioned amount of graphene oxide and glucose are mixed and dispersed uniformly in distilled water.

Specifically, the step may be performed by mixing the above-mentioned amount of graphene oxide, glucose and distilled water and then stirring for 5 to 30 minutes.

Further, the step a2) is not limited as long as the ammonia water is further mixed to proceed the reduction reaction, but specifically, the reaction can be carried out by raising the temperature of the reaction solution. The reaction temperature may range from 80 to 100° C., and preferably from 90 to 100° C. When the reaction temperature is lower than the above range, there is a problem that the reduction reaction cannot be performed sufficiently. When the reaction temperature is higher than the above-mentioned range, it is inappropriate for preparing, process-wise, because it results in maintaining a high temperature when the reduction reaction is sufficiently carried out even at a low temperature.

Further, the step a2) may be performed for 30 minutes to 120 minutes, and preferably 40 minutes to 90 minutes. If the reaction time is shorter than the above range, the reduction reaction cannot proceed sufficiently. If the reaction time is longer than the above-mentioned range, a heated state is maintained even when there is no further reduction reaction taking place, which is inappropriate for the process, efficiency-wise.

The method for preparing graphene balls of the present disclosure comprises spraying and drying in step c). When the graphene dispersion subjected to the reduction reaction is sprayed and dried, a graphene ball having a small size and a spherical shape can be produced. The spray drying process according to the present disclosure refers to a method in which dispersion is sprayed to produce droplets and then dried. Specifically, the spray drying process may be performed by rotary spraying, nozzle spraying, ultrasonic spraying, or a combination thereof. More specifically, nozzle spraying may be used.

Specifically, the spray drying process according to the present disclosure can use a twin-fluid nozzle. In particular, the spray drying process may include, spraying the graphene dispersion into aerosol droplets using a twin-fluid nozzle; transferring the aerosol droplets to a heating furnace; and evaporating a dispersion medium in the heating furnace. At this time, the twin-fluid nozzle to be used at this time is not particularly limited as long as it is used in the spray drying process, but specifically, a nozzle the sprays droplets in a size of 10 to 100 μm, more specifically 10 to 50 μm, may be used. The gas for transferring the sprayed droplets is not limited as long as the gas is an inert gas, but may be specifically argon, helium, nitrogen or a mixed gas thereof, and may be specifically argon. The flow rate of the gas for transferring the sprayed droplets is not limited as long as the gas is capable of transferring the droplets, but may be specifically 5 to 15 L/min, and more specifically 5 to 10 L/min. Further, the temperature of the heating furnace is not limited as long as it does not deform the graphene balls produced in the graphene dispersion, but it may be specifically 150 to 250° C., and more specifically 180 to 220° C. There is an advantage that the crystal form is further improved due to the heat applied when the dispersion medium is removed in the above temperature range. When the crystal form is improved by heating the dispersion liquid to the above-described temperature, graphene grains are aggregated with each other to produce graphene grains that are large in size and uneven. However, when the graphene grains are heated to the above-mentioned temperature, a crystal form is formed in the droplets, so uniformly sized graphene balls can be produced.

The production of graphene balls according to an embodiment of the present disclosure may further include drying, for removing the remaining dispersion medium after spraying and drying. When drying is further included, graphene balls having higher purity can be produced. Specifically, the drying step may be carried out at 50 to 70° C. for 6 to 48 hours and more specifically at 55 to 65° C. for 12 to 36 hours. When the drying process is carried out in the above-described range, not only the dispersion medium can be removed, but also the ammonia added at the time of the preparation of the dispersion can be removed to produce graphene balls having higher purity.

The production of graphene balls according to an embodiment of the present disclosure may further include a step of heat-treating the grains to remove residual impurities after the drying step. When the graphene is produced by the preparation method of the present disclosure, there is an advantage in that impurities on the surface of graphene can be easily removed even by heat-treatment at a relatively low temperature. The above-mentioned heat-treatment is not limited as long as it does not change the properties of the graphene, but may be carried out specifically at 200 to 400° C. and may be performed for 1 to 3 hours. Further, washing using conventionally used distilled water or an alcohol-based washing solution may be further included before and/or after the above-mentioned heat-treatment.

As described above, when the graphene balls are prepared by the preparation method according to one embodiment of the present disclosure, uniformly sized graphene balls can be prepared. Such uniformly sized graphene balls have the advantage of being easy to handle while maintaining the characteristics of graphene as described above. Specifically, the graphene balls prepared by the preparation method of one embodiment of the present disclosure may have a diameter of 500 nm to 2 μm, but the present disclosure is not limited thereto. Further, the graphene balls prepared by the preparation method of one embodiment of the present disclosure have the advantages of having a wide specific surface area and a high sphericalness.

In addition, one preferred embodiment of the present disclosure may be method for preparing a graphene ball including, A) preparing a first dispersion that includes graphene oxide, a reducing agent and water;

B) mixing the first dispersion with ammonia water to prepare a second dispersion; and C) spraying and drying the second dispersion.

A further preferred embodiment of the present disclosure may be a method for preparing graphene balls including, A1) preparing a first dispersion that includes graphene oxide, glucose and water;

B1) mixing the first dispersion with ammonia water to prepare a second dispersion;

C1) preparing an aerosol droplet using a twin twin-fluid nozzle and then drying the second dispersion; and D1) further drying the dried graphene balls at 40 to 70° C.

When preparing graphene balls with the above-mentioned preferred embodiments of the present disclosure, it is possible to minimize the amount of additives added at the time of preparing the graphene balls to produce graphene balls with fewer impurities. Since additives such as glucose and ammonia water can be easily removed even at a relatively low temperature, there is an advantage in that graphene balls that are easy remove impurities can be prepared.

Example 1

Graphene Oxide (GO) was prepared by modified Hummers method using graphite (99.9995% purity, Alfa Aesar, USA).

The prepared GO and glucose were mixed in distilled water so that the concentrations thereof became 0.5% by weight, respectively, followed by stirring to uniformly disperse. Graphene dispersion was prepared by mixing 500 mL of the prepared dispersion with 4 ml of ammonia water (28% by weight, OCI 社, Korea) and then stirring and reacting the mixture in an oil bath at 95° C. for 1 hour.

The prepared graphene dispersion was sprayed at 5 ml per minute using a twin-fluid nozzle to form an aerosol. The sprayed aerosol was transported by argon gas at a flow rate of 8 L/min to a 200° C. heating furnace, and the dispersion medium was evaporated at a set temperature to prepare graphene balls.

Example 2

Graphene balls were prepared in the same manner as in Example 1 except that the concentration of glucose was 1% by weight.

Example 3

Graphene balls were prepared in the same manner as in Example 1 except that the concentration of glucose was 2% by weight.

Comparative Example

Graphene balls were prepared in the same manner as in Example 1 except that graphene particles were prepared by spray-drying without mixing ammonia water.

[Crystal Form Analysis of Graphene]

According to the method for preparing graphene Examples 1 to 3, FIG. 1 shows X-ray diffraction patterns (XRD, Rigaku, RTP 300 RC) of graphene dispersion (a) prepared before spraying and drying, and graphene (b) prepared after spraying and drying.

Referring to FIG. 1, it was confirmed that the graphene powders were produced in a crystal form, and that as the spraying and drying was carried out at 200° C., the crystal form after the spraying and drying was further improved

[Raman's Analysis of Graphene]

Figure 2:
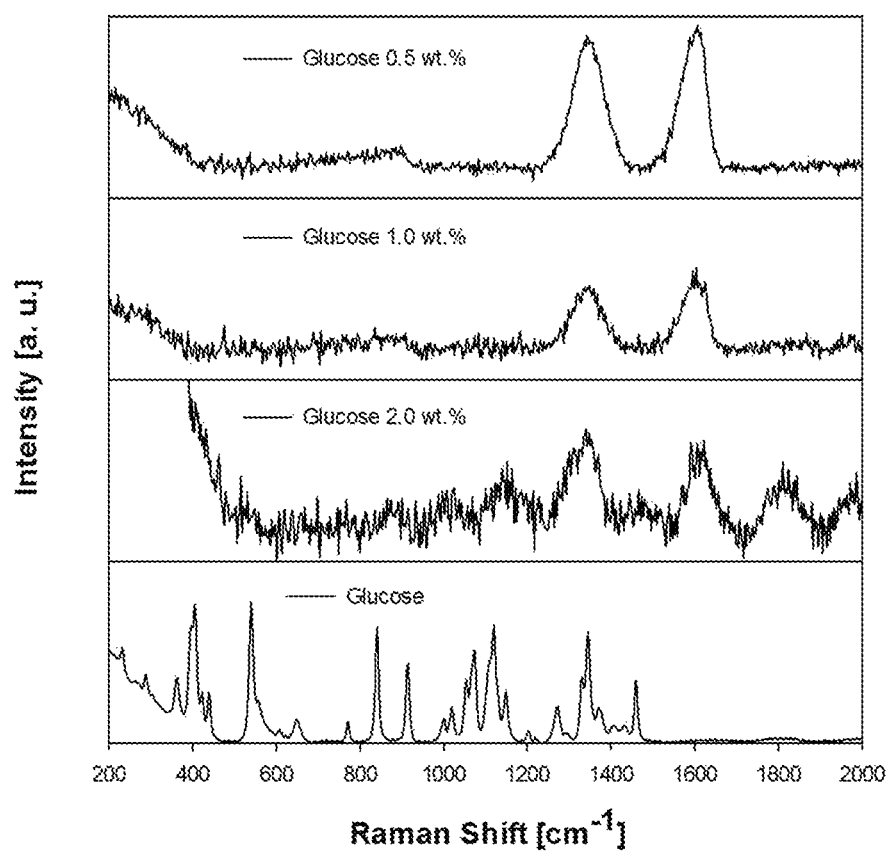
FIG. 2 shows an analysis result of a Raman analysis of graphene balls prepared according to changes in glucose concentration.

Raman spectra (Lambda ray, LSI Dimension P1, 532 nm laser excitation) of graphene and glucose prepared by the methods of Examples 1 to 3 are shown in FIG. 2.

Referring to FIG. 2, it can be seen that the samples of Examples 1 to 3 have produced typical graphene peaks, and that as the concentration of glucose increases, the noise increases and accordingly, the residual glucose affects the surface of graphene.

[Observation of Shape of Graphene Balls]

Figure 3:
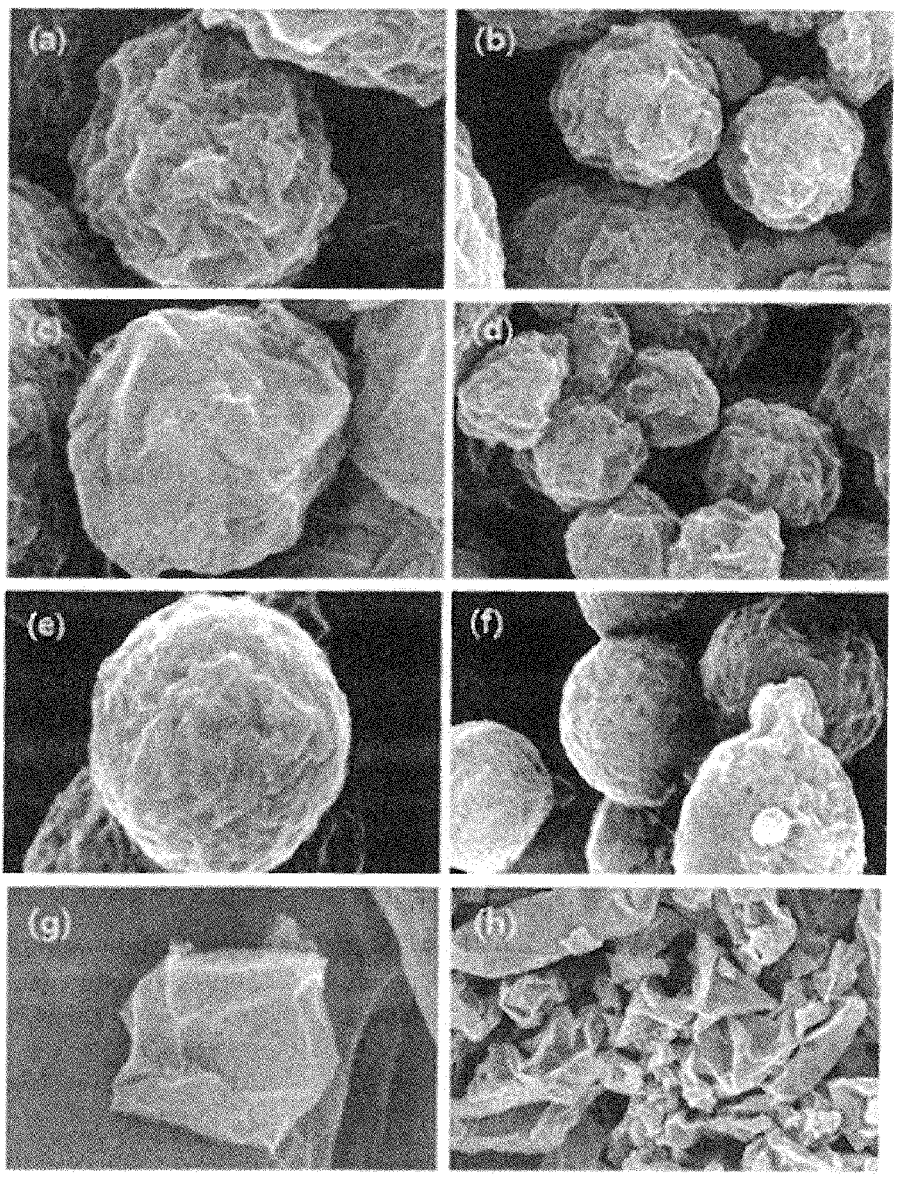
FIG. 3 shows scanning electron microscope (SEM) images of graphene balls prepared according to the presence or absence of ammonia water and the concentration of glucose.

The shape of the graphene prepared by the preparation method of each Example was observed using FE-SEM (Sirion, FEI, USA) and is shown in FIG. 3.

In FIG. 3, images (a) to (f) are scanning electron microscope images of graphene balls prepared by mixing glucose and ammonia water followed by spraying and drying. Images (g) and (h) are scanning electron microscope images of graphene balls that were prepared without mixing ammonia water (comparative example). At this time, in images (a) to (f), the concentration of glucose is, 0.5% by weight for images (a) and (b) (Example 1), 1% by weight for images (c) and (d) (Example 2), and 2% by weight for images (e) and (f) (Example 3).

Referring to FIG. 3, it can be seen that when the ammonia water is not mixed, the particle size is not uniform and does not have a spherical shape. As the concentration of glucose increases, it can be confirmed that it is closer to spherical shape.

[Evaluation of Electrochemical Characteristics of Graphene]

The graphene balls were prepared through the preparation method of Example 1, and by washing the graphene prepared by the method of Example 1 with distilled water and then heat-treating at 250° C. for 2 hours. The capacitance according to the current density of each of the prepared graphene balls was measured and shown in FIG. 4.

Specifically, this was measured with a 2-electrode symmetric system in an HS FLAT CELL (HOHSEN Corp., Japan) using an electrochemical analyzer (VSP, Bio-Logics, USA). 5 M KOH was used as an electrolyte and filter paper (Waterman, GF/C) was used as a separator.

Figure 4:
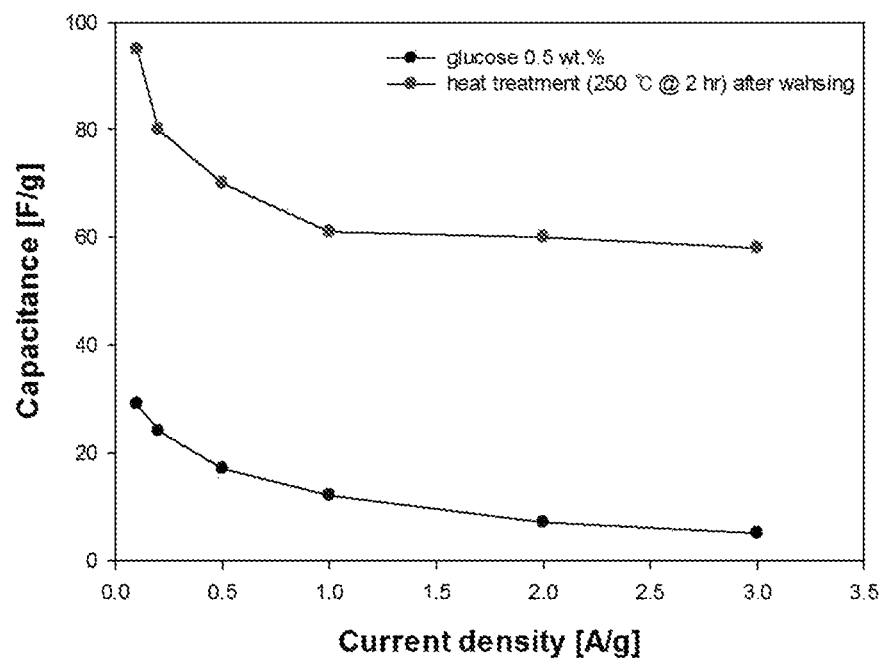
FIG. 4 is a graph showing the capacitance change according to the current density of the prepared graphene balls.

Referring to FIG. 4, it can be seen that the capacitance increases to about three times after the heat treatment at 250° C.

What is claimed is:

1. A method for preparing graphene balls comprising,
   a) preparing a dispersion which includes, a graphene oxide, a reducing agent ranging from a monosaccharide to a polysaccharide, and an ammonia aqueous solution, wherein the ammonia aqueous solution contains 20 to 35% by weight of the ammonia, and wherein the dispersion contains 1 to 10% by weight of the ammonia aqueous solution; and
   b) spraying and drying the dispersion,
   wherein the sphericalness of the graphene balls is Equation 1:

$$1 \leq \frac{d_{long}}{d_{short}} \leq 1.5 \qquad \text{[Equation 1]}$$

where,
$d_{short}$ is the shortest diameter of a graphene ball, and
$d_{long}$ is the longest diameter of the graphene ball.

2. The method of claim 1, wherein the step a) comprises,
   a1) preparing a first dispersion which includes a graphene oxide and a reducing agent ranging from a monosaccharide to a polysaccharide; and
   a2) mixing the first dispersion with an ammonia aqueous solution to prepare a second dispersion.

3. The method of claim 1, wherein the reducing agent ranging from a monosaccharide to a polysaccharide is one or more selected from a group consisting of glucose, fructose, galactose, sucrose, maltose and lactose.

4. The method of claim 1, wherein the dispersion contains 0.1 to 2% by weight of the graphene oxide.

5. The method of claim 1, wherein the dispersion contains 0.3 to 3% by weight of the reducing agent.

6. The method of claim 2, wherein the step a2) is performed at 80 to 100° C. for 30 minutes to 2 hours.

7. The method of claim 1, wherein the step b) is performed at 150 to 250° C.

8. The method of claim 1, further comprising,
   drying at 50 to 70° C. for 12 to 48 hours after the step b).

* * * * *